United States Patent Office 2,995,453
Patented Aug. 8, 1961

2,995,453
CERAMIC COATING COMPOSITIONS AND
ARTICLES COATED THEREWITH
Richard D. Noble, Chicago, Samuel W. Bradstreet, Oak Park, and Harold L. Rechter, Chicago, Ill., assignors to Armour Research Foundation of Illinois Institute of Technology, Chicago, Ill., a corporation of Illinois
No Drawing. Filed June 4, 1957, Ser. No. 663,333
5 Claims. (Cl. 106—39)

The instant invention relates to ceramic coating compositions which are readily applied to various substrates, and more particularly it relates to such compositions wherein a binder composed of a mixture of silica sol and a phosphate, or a mixture of boric oxide and a phosphate, or of silica sol and boric oxide, is incorporated. It further relates to articles coated therewith. Our compositions consist essentially of various particulate refractory materials such as selected oxides and silicates in combination with the binder substances. These compositions are initially deposited as a slurry and after very moderate heating, or in fact without heat being applied in some instances, form refractory coatings, which are either crystalline or non-crystalline, or mixtures of both, depending upon the particular mixture which is used. We have found that extremely adherent ceramic coatings may be produced from the instant compositions most simply by removal of their water content and thus the rather severe heat requirements of the ceramic coating processes of the prior art is not necessary.

To our knowledge, the prior art illustrates that in order to invest a substrate with a ceramic coating a great deal of heating is required. In some instances the ceramic material is fused onto the substrate surface in the form of a glassy, amorphous material whereas in other processes, either the base is heated, or the ceramic particles are directed through a flame onto the surface sought to be coated. Ceramic compositions are sometimes fused or at least brought to their sintering temperature in order to effect adherence. Such known procedures, with their rather rigorous heat requirements, are expensive and oftentimes require specialized equipment to be useful.

We have found that various selected compositions of silicates and/or refractory oxides may be combined with mixtures of silica sol or boric oxide and a phosphate source to produce slurries which readily yield crystalline or non-crystalline ceramic coatings. We find that merely by removing the water content of these compositions by mild heating or where time permits, by sublimation, extremely adherent coatings which possess excellent refractory properties are produced.

In view of the foregoing, one object of the instant invention is to provide novel ceramic coating compositions consisting essentially of a mixture of silica sol and a source of phosphate, such mixture acting as the binder material, and refractory materials selected from the group composed of silicates and refractory oxides.

Another object of the instant invention is to provide ceramic coating compositions consisting essentially of a mixture of boric oxide and a source of phosphate, such mixture acting as the binder material, and refractory materials selected from the group composed of silicates and refractory oxides.

Another object of the instant invention is to provide various substrate materials coated with crystalline ceramic coatings, wherein such coatings are bonded essentially through both silica molecules and oxygen atoms.

A further object of the instant invention is to provide ceramic coating compositions which are readily formed into coatings by the removal of water therefrom.

Other objects, features, and advantages of the instant invention will become apparent to those skilled in this particular art from the following detailed disclosure thereof.

Examples of compositions produced in accordance with the instant invention are as follows:

*Example I*

| | |
|---|---:|
| Zircon, −325 mesh_____gms__ | 100 |
| Mono-aluminum phosphate, 50% aqueous solution _____cc__ | 20 |
| Colloidal silica, 35% aqueous solution_____cc__ | 20 |

*Example II*

| | |
|---|---:|
| Alumina, −325 mesh_____gms__ | 50 |
| Zircon, −325 mesh_____gms__ | 50 |
| Phosphoric acid, 85% $H_3PO_4$_____cc__ | 20 |
| Colloidal silica, 35% aqueous solution_____cc__ | 20 |

*Example III*

| | |
|---|---:|
| Zirconia, −325 mesh_____gms__ | 100 |
| Mono-aluminum phosphate, 50% aqueous solution _____cc__ | 20 |
| Colloidal silica, 35% aqueous solution_____cc__ | 20 |

*Example IV*

| | |
|---|---:|
| Stabilized zirconia, −325 mesh_____gms__ | 90 |
| Boric oxide_____gms__ | 10 |
| Mono-aluminum phosphate, 50% aqueous solution _____cc__ | 30 |
| Water_____cc__ | 20 |

*Example V*

| | |
|---|---:|
| Stabilized zirconia, −325 mesh_____gms__ | 90 |
| Boric oxide_____gms__ | 10 |
| Colloidal silica, 35% aqueous solution_____cc__ | 20 |

The compositions of the instant invention are formed into a slurry mixture and then applied to the surface sought to be coated. Such application may be, for example, by dipping, spraying, or painting, or in fact by any other known means of depositing one material upon another. As above mentioned, once the material has been applied in order to form those desirable new coatings it is only necessary to remove a portion or all of the water therefrom. Coatings which are extremely coherent inter se and adherent to the substrate material are thus produced.

It should of course be understood that our invention is not limited to the above specific examples of materials, or of their relative concentrations. Practically any reasonable concentration of colloidal silica assists in the operative formation of these coatings and sources of inorganic phosphates may be likewise used. Other equivalent refractory oxides and silicates, either alone or in combination may be likewise used.

We claim as our invention:
1. A coating composition consisting essentially of a mixture of:

| | |
|---|---:|
| Zircon, −325 mesh_____grams__ | 100 |
| Mono-aluminum phosphate, 50% aqueous solution _____cc__ | 20 |
| Colloidal silica, 35% aqueous solution_____cc__ | 20 | said mixture yielding a crystalline material upon the removal of water therefrom and in interacting upon water removal to form a cohesive coating.

2. A coating composition consisting essentially of a mixture of:

| | |
|---|---:|
| Alumina, −325 mesh_____grams__ | 50 |
| Zircon, −325 mesh_____do____ | 50 |
| Phosphoric acid, 85% $H_3PO_4$_____cc__ | 20 |
| Colloidal silica, 35% aqueous solution_____cc__ | 20 | said mixture yielding a crystalline material upon the removal of water therefrom and interacting upon water removal to form a cohesive coating.

3. A coating composition consisting essentially of a mixture of:

| | | |
|---|---|---|
| Zirconia, −325 mesh | grams | 100 |
| Mono-aluminum phosphate, 50% aqueous solution | cc | 20 |
| Colloidal silica, 35% aqueous solution | cc | 20 | said mixture yielding a crystalline material upon the removal of water therefrom and interacting upon water removal to form a cohesive coating.

4. A coating composition consisting essentially of a mixture of:

| | | |
|---|---|---|
| Stabilized zirconia, −325 mesh | grams | 90 |
| Boric oxide | do | 10 |
| Mono-aluminum phosphate, 50% aqueous solution | cc | 30 |
| Water | cc | 20 | said mixture yielding a crystalline material upon the removal of water therefrom and interacting upon water removal to form a cohesion coating.

5. A coating composition consisting essentially of a mixture of:

| | | |
|---|---|---|
| Stabilized zirconia, −325 mesh | grams | 90 |
| Boric acid | do | 10 |
| Colloidal silica, 35% aqueous solution | cc | 20 | said mixture yielding a crystalline material upon the removal of water therefrom and interacting upon water removal to form a cohesive coating.

References Cited in the file of this patent

UNITED STATES PATENTS

| | | |
|---|---|---|
| 1,181,800 | Randolph | May 2, 1916 |
| 1,601,231 | Blumenberg | Sept. 28, 1926 |
| 1,791,591 | Caven | Feb. 10, 1931 |
| 2,233,700 | Grossman | Mar. 4, 1941 |
| 2,329,589 | Carter | Sept. 14, 1943 |
| 2,380,945 | Collins | Aug. 7, 1945 |
| 2,618,530 | Gardner | Nov. 18, 1952 |
| 2,802,749 | West et al. | Aug. 13, 1957 |
| 2,856,302 | Reuter | Oct. 14, 1958 |